United States Patent [19]

Irwin et al.

[11] Patent Number: 5,710,475
[45] Date of Patent: Jan. 20, 1998

[54] INSULATION OF HIGH THERMAL CONDUCTIVITY AND APPARATUS CONTAINING SAME

[75] Inventors: Patricia Chapman Irwin, Altamont; Charles Edward Baumgartner, Niskayuna; Donald Allen Bolon, Charlton, all of N.Y.

[73] Assignee: General Electric Company, Schenectady, N.Y.

[21] Appl. No.: 561,997

[22] Filed: Nov. 22, 1995

[51] Int. Cl.$^6$ .............................. H02K 1/12; B32B 15/08
[52] U.S. Cl. ................................... 310/254; 174/120 SR; 428/379; 428/450; 428/458; 428/473.5
[58] Field of Search ................... 310/254; 174/120 SR; 428/379, 458, 450, 473.5; 524/404, 428

[56] References Cited

U.S. PATENT DOCUMENTS

| | | | |
|---|---|---|---|
| 4,563,488 | 1/1986 | Minami et al. | 523/222 |
| 5,011,872 | 4/1991 | Latham et al. | 523/440 |
| 5,552,222 | 9/1996 | Bolon et al. | 428/379 |

*Primary Examiner*—D. S. Nakarani
*Attorney, Agent, or Firm*—William H. Pittman

[57] ABSTRACT

Metallic conductors of electricity, such as stator bars in turbine generators, are coated with an insulating composition comprising a high temperature-resistant thermoplastic resin, such as a polyimide or polyethersulfone, having uniformly dispersed therein boron nitride or aluminum nitride in a proportion effective to provide a high thermal conductivity. Boron nitride is preferred by reason of its extremely high thermal conductivity, viscosity-decreasing properties and other advantages.

10 Claims, No Drawings

INSULATION OF HIGH THERMAL CONDUCTIVITY AND APPARATUS CONTAINING SAME

BACKGROUND OF THE INVENTION

This invention relates to the insulation of metallic conductors of electricity, and more particularly to the fabrication of insulting materials comprising thermoplastic resins and having improved electrical and thermal properties.

Insulation on high voltage electrical conductors, including generator parts such as stator bars and tie rods, is frequently exposed to conditions which can cause breakdown of said insulation. Such phenomena include corona discharges and the effects of high temperatures.

At present, one method of insulating stator bars is to wrap them in paper and/or cloth impregnated with a thermosetting resin, typically an epoxy resin, and then to apply one or more strippable layers, cure the resin by immersion in heated asphalt, cool the assembly and remove the asphalt. In another method, the bar is initially wrapped in paper and/or cloth and placed in a vessel, which is then evacuated and charged with thermosetting resin which impregnates the wrapping, after which the assembly is cured. These are space- and labor-intensive sequences of operations. A simpler method is desirable.

Among the more simply applied insulation materials proposed for use are thermoplastic resins. Temperature-resistant resins such as polyimides, polyetherketones, polysulfones and polyphthalamides have recently been of interest. However, even though they successfully survive relatively high temperatures under many conditions, the continuously high temperatures encountered in use on such items as stator bars and tie rods are often too severe for the thermoplastic resins. This is in part a result of the relatively poor thermal conductivity of said resins.

In conventional stator bar insulation which typically comprises a thermosetting epoxy resin, the incorporation of such fillers as mica increases thermal conductivity and also inhibits electrical degradation by corona discharge and the like. It has been found, however, that incorporation of mica and similar inorganic fillers in thermoplastic resins for heavy duty insulation use offers no advantages over insulation comprising mica-containing thermoset resins. This is unfortunate for at least two reasons. First, there is potential for the employment of an extrusion procedure for application of a thermoplastic resin to a conductor and such a procedure could be simpler and more economical than the complicated one now in use with thermosetting resins. Second, a substantial increase in thermal conductivity could permit fabrication of stator bars containing substantially fewer strands or a lesser amount of copper conducting material, further decreasing cost and simplifying fabrication.

Another problem with mica and similar materials as fillers is that their use in thermoplastic resins substantially increases viscosity, which is extremely undesirable since high temperature-resistant thermoplastics are already very viscous and making them more viscous can make them essentially unprocessable. Still another problem is that many inorganic materials cause severe damage to processing equipment such as extruders, typically by eroding extruder screws to such an extent that they soon become totally unusable.

It remains of interest, therefore, to develop thermoplastic-based insulating materials which are resistant to electrical damage such as corona discharge, which have high thermal conductivities and which are capable of being applied to such conductors as stator bars in a relatively simple process. Of particular interest is the development of insulating materials having thermal conductivities of at least 0.35 W/m°K and as high as 0.70 W/m°K, since insulation of that type could permit the fabrication of stator bars with only about 67% of the copper strands presently required.

SUMMARY OF THE INVENTION

The present invention is based on the discovery that boron nitride and aluminum nitride may be incorporated in thermoplastic resins as fillers, providing insulating compositions of high thermal conductivity and excellent processability.

One aspect of the invention, therefore, is an insulating composition comprising a high temperature-resistant thermoplastic resin having uniformly dispersed therein of at least one nitride selected from the group consisting of boron nitride and aluminum nitride in a proportion effective to produce a thermal conductivity in said composition of at least 0.35 W/m°K at 180° C.

Another aspect is an article comprising a metallic conductor of electric current having on its surface an insulating coating comprising such a composition. Still another aspect is a turbine generator comprising a plurality of stator bars, each of which is insulated with a coating of such a composition.

DETAILED DESCRIPTION; PREFERRED EMBODIMENTS

The compositions of this invention can comprise any heat-resistant thermoplastic resin. Resins often particularly preferred for this purpose are polyimides (including polyetherimides), polyphthalamides, polyetherketones, polysulfones (including polyethersulfones and polyphenylsulfones), polydiorganosiloxanes (silicones), polyestercarbonates and liquid crystalline polyesters.

The crux of the invention is the incorporation in said thermoplastic resin of boron nitride, aluminum nitride or a mixture thereof in an amount effective to produce a specific threshold thermal conductivity. Boron nitride is generally preferred for several reasons. First, its use can produce compositions whose thermal conductivities are as much as 5–6 times as great as those of presently known conventional thermoset insulating materials. Second, the particles of boron nitride are in platelet form and have a very low coefficient of friction; as a result, compositions containing boron nitride require substantially less torque (often as much as 20% less) than those containing aluminum nitride during extrusion. Third, boron nitride has a high electrical resistivity and thus contributes to the insulating effectiveness of the composition. Fourth, boron nitride is superior in its moisture stability.

Commercially available nitrides typically contain a minor proportion of oxygen as boron oxide or aluminum oxide. It is preferred for the purposes of the invention that the oxygen proportion be no greater than about 0.5% based on total nitride. However, the invention contemplates the use of nitrides having a greater oxygen proportion, most often up to about 4%.

Particle size of the nitride is not critical, provided the desired thermal conductivity and other properties are attained. In general, an average particle size in the range of about 1–100 microns is acceptable.

The compositions of this invention may contain additional materials added for such purposes as increasing corona resistance. Such materials can include inorganic fillers such as silica and alumina, especially fumed silica and fumed alumina.

The proportion of nitride in the compositions of this invention is a proportion which is effective to produce a thermal conductivity in the composition of the invention of at least 0.35, preferably at least 0.45 and most preferably at least 0.60 W/m°K, as measured at 180° C. by ASTM procedure F433. At higher conductivity values, the efficiency of the insulating layer is high enough to permit fabrication of stator bars having less strands of copper than otherwise. It may be possible to decrease the number of strands by as much as one-third and still conduct the same current, owing to improved heat dissipation through the insulation.

In the case of aluminum nitride, this amount is typically at least about 20%, all percentages herein being by weight; for boron nitride, it may be as low as about 5%. Other inorganic fillers such as silica and alumina, when present, are most often in the amount of about 5–10%. In general, the proportion of total inorganic materials will not exceed 55%. All of said percentages are based on total constituents; i.e., resin, boron nitride or aluminum nitride and any additional fillers.

Fabrication of the compositions of this invention may be achieved by simple melt blending techniques applicable to thermoplastic resins. These include batch operations of the kind performed in Brabender mixers and the like, and continuous operations utilizing such mixing devices as extruders.

Extrusion is often a particularly preferred method of fabrication. It is within the scope of the invention to extrude the composition directly onto the stator bar or other conducting element, using a die coupled to a flexible resin conduit and employing automated techniques where necessary to coat curved sections of a stator bar or the like. The thickness of the insulating coating is most often in the range of about 100–1,000 microns but may be as great as 0.2–0.3 cm.

Such methods of fabrication and deposition on the conducting element show promise of being notably simpler to perform than the deposition of thermosetting insulation.

The invention is illustrated by a series of runs in which various thermoplastic resins were blended with boron nitride or aluminum nitride and, optionally, fumed silica or fumed alumina as an additional filler. Blending was by melt blending in an extruder. The compositions thus prepared were evaluated for thermal conductivity at 180° C., using ASTM procedure F433.

Some of the materials tested are more fully identified as follows.

Polyetherimide: a commercially available polymer prepared by the reaction of m-phenylenediamine with 2,2-bis[4-(3,4-dicarboxyphenoxy)phenyl]propane dianhydride.

Silicone: a commercially available polydimethylsiloxane.

Polysulfone: a polyphenylsulfone commercially available from Amoco Chemicals under the designation "Radel R".

Fumed silica: a product commercially available from Degussa under the designation "Aerosil OX50".

The results are given in the following table. For comparison, the thermal conductivity of a polysulfone containing no nitride is also provided.

| Resin | Boron nitride % oxygen | Boron nitride Amount, % | Aluminum nitride amount, % | Fumed silica amount, % | Fumed alumina amount, % | Thermal conductivity, W/m° K. |
|---|---|---|---|---|---|---|
| Control | — | — | — | — | — | 0.24 |
| Polyetherimide | 0.4 | 14.6 | — | — | — | 0.42 |
| Silicone | 3.0 | 20 | — | — | — | 0.38 |
| Silicone | 3.0 | 40 | — | — | — | 0.38 |
| Polysulfone | 0.4 | 30 | — | — | — | 0.87 |
| Polysulfone | 0.4 | 30 | — | 10 | — | 0.90 |
| Polysulfone | 0.4 | 30 | — | — | 5 | 1.05 |
| Polysulfone | 0.4 | 40 | — | — | — | 1.10 |
| Polysulfone | 0.4 | 50 | — | — | — | 1.60 |
| Polysulfone | — | — | 20 | — | — | 0.36 |
| Polysulfone | — | — | 30 | — | — | 0.43 |
| Polysulfone | — | — | 30 | 7.5 | — | 0.50 |
| Polysulfone | — | — | 40 | — | — | 0.57 |
| Polysulfone | — | — | 50 | — | — | 0.68 |

It is apparent from the table that the compositions of this invention have thermal conductivities of at least 0.35 W/m°K, and that many of the thermal conductivity values are above 0.45 and even well above 0.60 W/m°K. Thus, said compositions are well adapted for insulation of such conductors as stator bars.

What is claimed is:

1. A turbine generator comprising a plurality of stator bars, each of which is insulated with a coating of a composition comprising a high temperature-resistant thermoplastic resin which is a polyimide, polyphthalamide, polyetherketone, polysulfone, polydiorganosiloxane, polyestercarbonate or liquid crystalline polyester, having uniformly dispersed therein at least one nitride selected from the group consisting of boron nitride and aluminum nitride in a proportion effective to produce a thermal conductivity in said composition of at least 0.35 W/m°K at 180° C.

2. A generator according to claim 1 wherein the nitride is boron nitride.

3. A generator according to claim 2 wherein the proportion of boron nitride is about 5–55% by weight based on total constituents.

4. A generator according to claim 1 wherein the nitride is aluminum nitride.

5. A generator according to claim 4 wherein the proportion of aluminum nitride is about 20–55% by weight based on total constituents.

6. A generator according to claim 1 further comprising at least one other inorganic filler.

7. A generator according to claim 6 wherein said other filler is fumed silica.

8. A generator according to claim 6 wherein said other filler is fumed alumina.

9. A generator according to claim 1 wherein the thermoplastic resin is a polyetherimide.

10. A generator according to claim 1 wherein the thermoplastic resin is a polyphenylsulfone.

* * * * *